Figure 1:
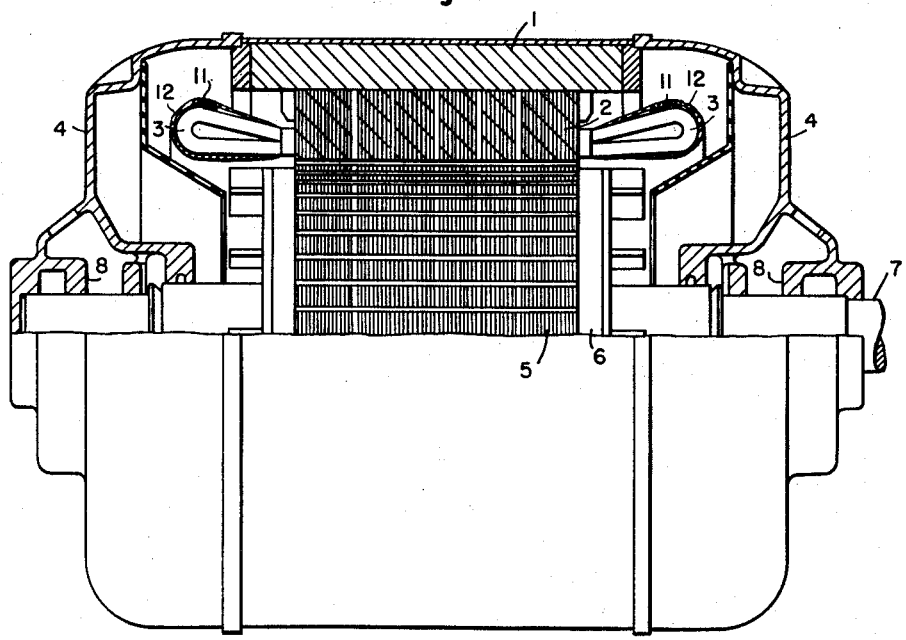

July 28, 1953 — R. W. EGGLESTONE — 2,647,215
SPACE HEATING MEANS FOR DYNAMOELECTRIC MACHINES
Filed Aug. 18, 1951

WITNESSES:

INVENTOR
Robert W. Egglestone.
BY
ATTORNEY

Patented July 28, 1953

2,647,215

UNITED STATES PATENT OFFICE 2,647,215

SPACE HEATING MEANS FOR DYNAMO-ELECTRIC MACHINES

Robert W. Egglestone, Buffalo, N. Y., assignor to Westinghouse Electric Corporation, East Pittsburgh, Pa., a corporation of Pennsylvania Application August 18, 1951, Serial No. 242,517

3 Claims. (Cl. 310—72)

The present invention relates to space heating means for dynamo-electric machines, for preventing condensation of moisture on the windings of such machines.

It is frequently desirable, or necessary, to provide some means for heating dynamo-electric machines when they are not running, in order to prevent condensation of moisture on the windings, which reduces the insulation resistance and is very undersirable. This is especially necessary for electric motors which may be idle for considerable periods and which are used in locations of high humidity. In an open motor, there is sufficient circulation of air between the inside and outside of the motor, even when it is not running, to keep the absolute humidity of the air inside the motor the same as on the outside. It is only necessary, therefore, to maintain the temperature of the winding a few degrees higher than the temperature outside the motor, since this will keep the relative humidity of the air at the surface of the winding always below 100%, and no condensation will occur. A temperature difference of the order of 5° C. is usually sufficient to prevent condensation. In totally enclosed motors, the problem is slightly different, and the necessity of heating is not always as great, but under adverse conditions, heating may still be necessary. When a totally enclosed machine is running, there is a slight circulation of air between the inside and outside of the machine, because the housing is not absolutely gas-tight, and differences in pressure exist between various parts of the machine. When the machine is not running, however, there are no pressure differences, and there is little or no circulation of air between the interior of the machine and the outside, so that the absolute humidity inside the motor is not affected by changes in outside humidity. The temperature of the machine, however, is affected by the outside temperature, and if the temperature falls low enough, the inside temperature may drop below the dew point, with resultant condensation of moisture in the machine. Where such conditions may occur, heating of enclosed motors is necessary.

One method of heating dynamo-electric machines to prevent condensation is to apply a low voltage to the motor terminals, when the machine is idle, to cause a small current to flow through the windings. This provides very effective heating since the heat is generated in the windings itself, and is thus applied directly where it is needed. The method, however, has the disadvantages of requiring a special transformer to supply the specific low voltage needed, and of requiring special interlock means in the motor control to energize the heating transformer when the motor is deenergized, and to prevent the line voltage and the low heating voltage from being applied to the motor simultaneously. This method of heating therefore involves considerable expense.

The more usual means for heating motors is to provide separate space heaters disposed in suitable locations within the motor to provide the necessary heat. Such heaters can readily be designed for operation on the available line voltage, but this heating means has the great disadvantage that a large number of different types and sizes of space heaters are required for the many different sizes and types of motors in which they may be required, and some extra machining of the motor frame is usually necessary for mounting the heaters. Another disadvantage is that it is not always possible to locate such heaters in the most desirable position, because they must be placed where space is available within the motor housing. Thus, they may not always be fully effective, because space heaters can only change the temperature by a relatively small amount above the outside temperature, and if the temperature falls sufficiently, condensation may occur on the winding in spite of the presence of space heaters.

When condensation occurs in a motor, it occurs on the cooler surfaces within the motor. In enclosed motors, and in some other types of motors, it has been necessary to use cartridge type space heaters placed in the frame ducts through which the internal air circulates. With this arrangement, and with other arrangements where heaters are mounted in the frame, the heat is applied to the frame rather than to the windings, and if condensation occurs, it is likely to occur on the winding since the winding is cooler than the frame. If the heat were applied directly to the windings, however, the frame would be cooler and condensation would occur on the lower portion of the frame, where condensation of moisture would do little harm. No suitable type of space heating means has been available, however, which could be applied directly to the winding of an electric motor.

The principal object of the present invention is to provide a simple and inexpensive space heating means for dynamo-electric machines which applies the heat directly to the windings.

Another object of the invention is to provide space heating means for dynamo-electric machines which is applied directly to the windings, where the heat is needed, and which can readily be applied to any machine without requiring a large number of different types of heaters, and without requiring any extra machining of the frame.

A more specific object of the invention is to provide space heating means for dynamo-electric machines which consists of a suitable number of turns of resistance wire wound directly on the end turns of the stator winding, thus applying heat directly to the winding, where it is needed, and providing a simple and inexpensive space heating means.

Figure 2:
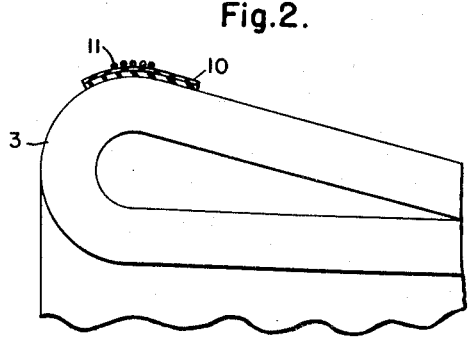

The invention will be more fully understood from the following detailed description, taken in connection with the accompanying drawing, in which:

Figure 1 is a view, partly in elevation and partly in longitudinal section, of an electric motor embodying the invention; and Fig. 2 is a fragmentary detail view on a larger scale, illustrating the arrangement of the space heating means.

As indicated above, the invention is applicable to dynamo-electric machines of any type or size, and either open or enclosed. For the purpose of illustration, the invention is shown in the drawing applied to an alternating current motor having a frame structure 1 in which is supported a laminated stator core 2 of any suitable or usual construction. The core 2 has longitudinal slots in its inner periphery, and a stator winding 3 of any suitable type is placed in the slots with the end turns of the winding extending beyond the core at both ends. The ends of the motor are closed by suitable end brackets 4, and the motor has a rotor 5 which is shown as being provided with a squirrel-cage winding 6. The rotor 5 is mounted on a shaft 7 which is supported in bearings 8, of any suitable type, in the end brackets 4.

As previously explained, condensation of moisture may occur on the winding 3 when the motor is idle, and this is very undesirable because of its adverse effect on the insulation of the winding. In accordance with the present invention, heating means for preventing such condensation are applied directly to the end turns of the winding 3. As shown more clearly in Fig. 2, the heating means is preferably insulated from the winding 3 by a layer of insulating material 10 applied to the surface of the winding 3. The insulation 10 may comprise a suitable number of turns of an insulating material, such as varnished cambric tape, wrapped circumferentially around the end turns near their outer extremities to form a continuous band of insulation. The heating means itself consists of a suitable number of turns of resistance wire 11, preferably insulated, wound circumferentially of the machine over the insulating layer 10 on the end turns of the winding 3. In some cases, the insulating layer 10 may not be necessary and may be omitted. The heater wire 11 is preferably wound in place before the final varnish treatment of the winding 3, and after the resistance wire has been wound, the core 2 with the winding in place is dipped in varnish and baked, in the usual manner, so that the winding 3 and heaters 11 are covered with a strong insulating film or coating of varnish, indicated at 12.

It will be obvious that the heater 11 can readily be designed to obtain any desired amount of heat by using the proper size of resistance wire and the proper number of turns. Heaters may be applied on both ends of the winding, as shown in the drawing, or on one end only, and if used on both ends, the heaters may be connected either in series or in parallel for energization by the line voltage. It will be seen, therefore, that heaters for a wide variety of sizes and types of motors can easily be provided using only one or two different sizes of resistance wire, which is a great advantage, since the necessity for providing a large number of different types and sizes of heaters is completely eliminated. The expensive extra machining of the frame, which is often required for mounting space heaters of the conventional type, is also eliminated. Thus, a very simple and effective space heating means is provided at low cost. Since the heater 11 is applied directly on the surface of the winding 3, the heat is provided in the exact location where it is needed, and condensation of moisture on the windings is thus positively prevented under all conditions. The heater is effectively insulated from the winding by the insulating material 10, in cases where the insulation of the winding 3 is of a type which makes this additional insulation necessary, and since the heater is preferably applied before the varnish treatment, it is securely held in place by the insulating varnish and is protected and insulated by the varnish.

It should now be apparent that space heating means has been provided for dynamo-electric machines which provides the required heat at the place where it is most needed and which is extremely simple and inexpensive, thus avoiding the necessity for the expensive and less effective types of space heaters which have previously been used. It will be obvious that this heater is applicable to motors of any type and size, and it is to be understood therefore that although a specific embodiment of the invention has been shown and described for the purpose of illustration, the invention is not limited to the particular details shown, but in its broadest aspects it includes all equivalent embodiments and modifications which come within the scope of the appended claims.

I claim as my invention:

1. A dynamo-electric machine having a stator member and a rotor member, said stator member having a slotted core, a stator winding in the slots of the core, said stator winding having end portions extending beyond the ends of the core, and an electric heating element disposed on at least one of said end portions of the stator winding, said heating element comprising resistance wire adapted to carry a substantial current to produce sufficient heat to prevent condensation of moisture on the winding when the machine is not energized.

2. A dynamo-electric machine having a stator member and a rotor member, said stator member having a slotted core, a stator winding in the slots of the core, said stator winding having end portions extending beyond the ends of the core, and an electric heating element disposed on at least one of said end portions of the stator winding, said heating element comprising a plurality of turns of resistance wire wound circumferentially of the stator member on the end portion of the winding, the heating element being adapted to carry a substantial current to produce sufficient heat to prevent condensation of moisture on the winding when the machine is not energized.

3. A dynamo-electric machine having a stator member and a rotor member, said stator member having a slotted core, a stator winding in the slots of the core, said stator winding having end portions extending beyond the ends of the core, an electric heating element disposed on at least one of said end portions of the stator winding, said heating element comprising a plurality of turns of resistance wire wound circumferentially of the stator member on the end portion of the winding, the heating element being adapted to carry a substantial current to produce sufficient heat to prevent condensation of moisture on the winding when the machine is not energized, and a continuous, common coating of insulating varnish covering the winding and heating element and holding the heating element in place.

R. W. EGGLESTONE.

References Cited in the file of this patent

UNITED STATES PATENTS

| Number | Name | Date |
|---|---|---|
| 1,582,853 | Newmeyer | Apr. 27, 1926 |
| 1,709,643 | Whittaker | Apr. 16, 1929 |
| 1,987,725 | Veinott | Jan. 15, 1935 |